United States Patent [19]
Liu

[11] Patent Number: 5,466,059
[45] Date of Patent: Nov. 14, 1995

US005466059A

[54] INTERFACE SEAT FOR A PERSONAL COMPUTER

[75] Inventor: Morgan C. Liu, Taoyuan, Taiwan

[73] Assignee: Enlight Corporation, Taoyuan, Taiwan

[21] Appl. No.: 22,370

[22] Filed: Feb. 25, 1993

[51] Int. Cl.⁶ .......................... A47B 77/08; A47B 81/00
[52] U.S. Cl. ...................... 312/223.2; 361/683; 361/725; 361/829
[58] Field of Search ................... 312/223.2; 361/683, 361/725, 829, 724

[56] References Cited

U.S. PATENT DOCUMENTS

| | | | |
|---|---|---|---|
| 5,138,525 | 8/1992 | Rodriguez | 312/223.2 X |
| 5,157,590 | 10/1992 | Barthel et al. | 361/725 X |
| 5,164,886 | 11/1992 | Chang | 361/724 X |
| 5,224,019 | 6/1993 | Wong et al. | 361/393 |
| 5,224,024 | 6/1993 | Tu et al. | 364/429 |

FOREIGN PATENT DOCUMENTS 4013985  11/1991  Germany ..................... 361/725

*Primary Examiner*—Joseph M. Gorski
*Attorney, Agent, or Firm*—Ladas & Parry

[57] ABSTRACT

A structure of an interface seat for quickly engaging and disengaging with a back plate, an I/O port retaining plate, and a disk drive bracket on a computer base casing having a back plate, comprises an upper flange, an lower flange, and two side flanges. The back plate comprises a cut-out recess for disposing the interface seat. The upper flange of the interface seat is provided with an upper stop strip extended outward therefrom for abutting against the disk drive bracket. The lower flange is provided with a plurality of recesses for engaging with outward-inclined tabs provided on the top edge of the I/O retaining plate. Each of the side flanges is provided with a side stop strip extended outward therefrom for abutting against the back plate.

1 Claim, 3 Drawing Sheets

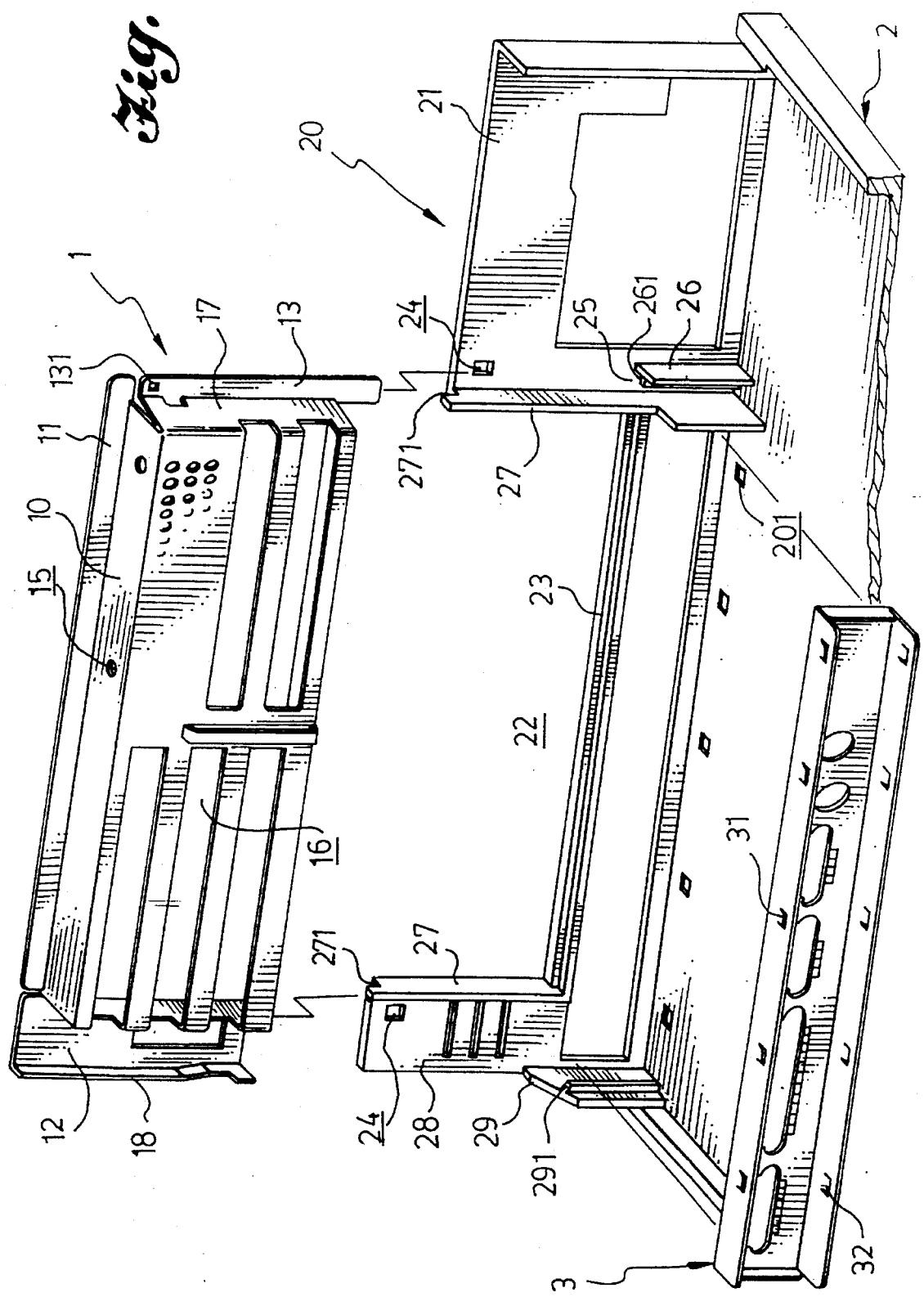

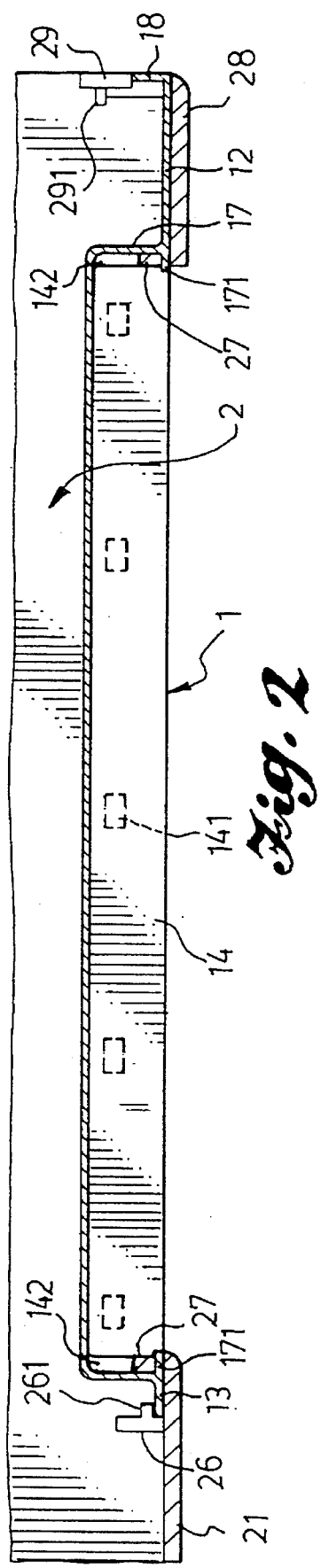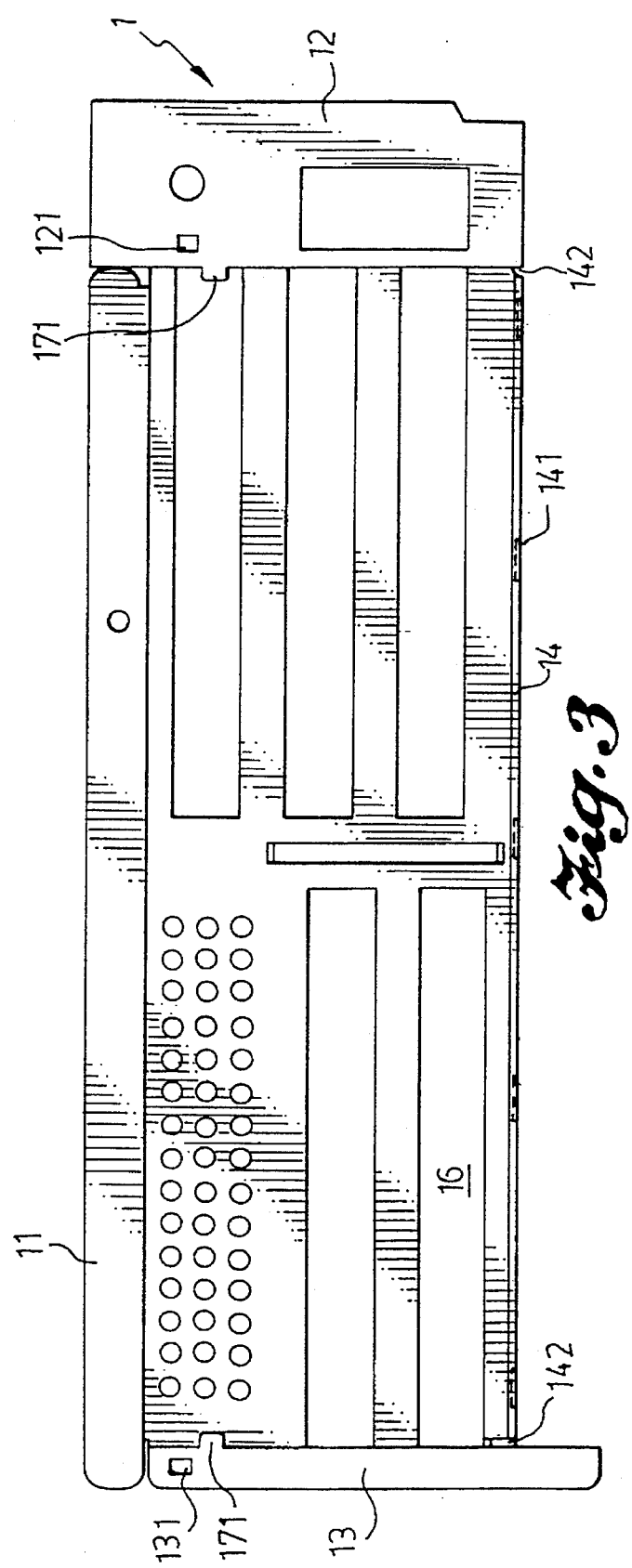

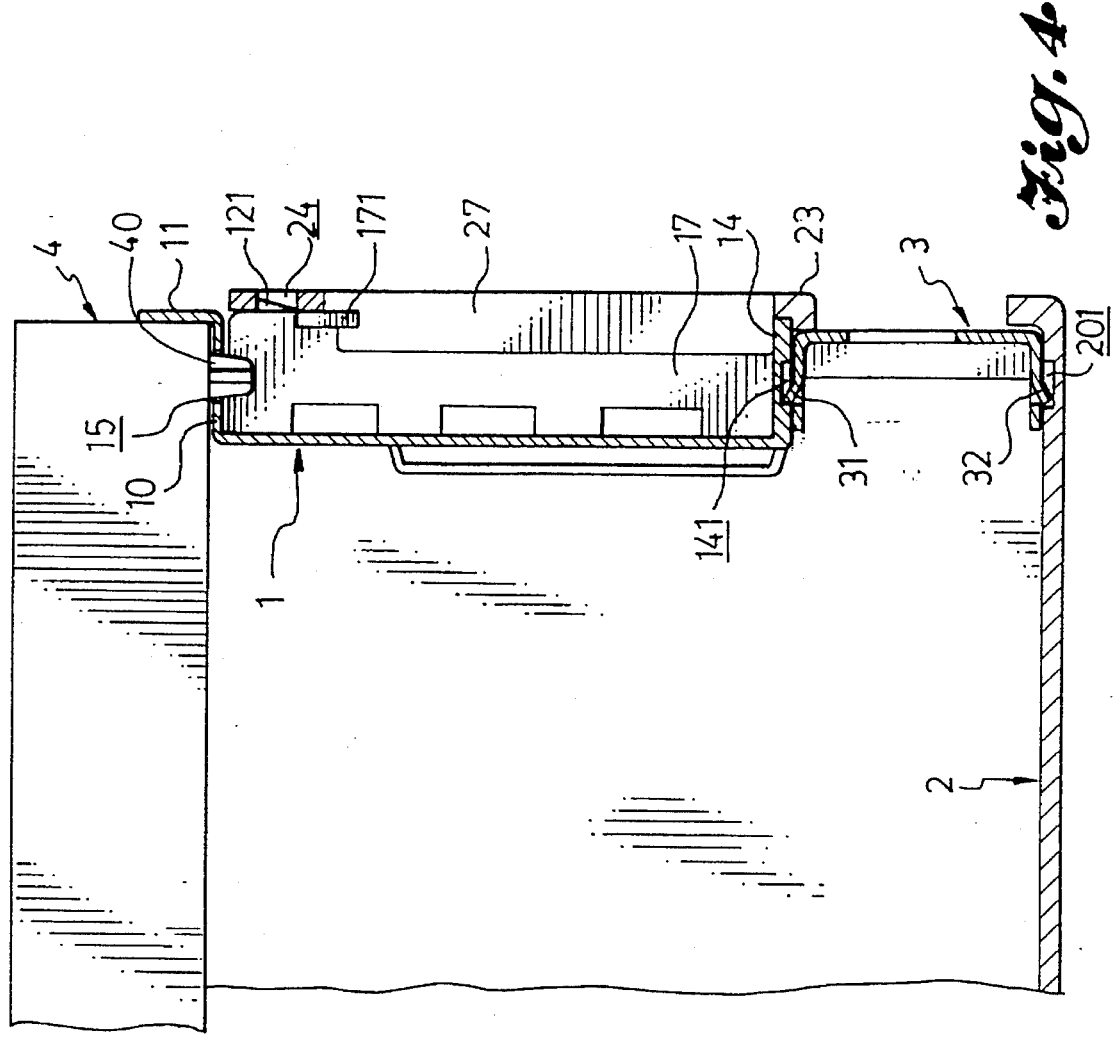

INTERFACE SEAT FOR A PERSONAL COMPUTER

BACKGROUND OF THE INVENTION

The present invention relates generally to an interface seat serving as a connecting panel for a PC system unit, in particular, the interface seat is capable of engaging and disengaging quickly with the back plate, I/O port retaining plate, and disk drive bracket on the base casing of a personal computer.

In general, the conventional interface panel is installed on the rear side of the base casing. Not only is the rear part of the base casing enclosed by the interface panel, but the interface panel also has space for ventilation, spare expansion slots, and rooms for connectors. In most cases, the interface panel and associated components are connected by screws. By this tedious way, not only the manufacturing process is time consuming, but also maintenance becomes very inconvenient. Many tiny screws have to be removed and reinstalled during frequent maintenance, expansion, and replacement. In the event that few screws are lost, the whole assembly might get stuck. Moreover, the interface panel containing the I/O port retaining plate is integrally formed and thus has to be replaced in whole when the capacity, model, or specification of the interface panel can not fulfill the expansion requirements.

SUMMARY OF THE INVENTION

It is therefore an object of this invention to provide a structure of an interface seat for engaging and disengaging with a back plate, an I/O port retaining plate, and a disk drive bracket on a base casing of a personal computer without causing the above drawbacks.

Another object of this invention is to provide a screw-free interface seat, which increases productivity of assembling PC units and minimizes the assembly time and labor cost. Thus, high efficiency for both manufacturing and marketability is obtained.

A further object of this invention is to provide a rapid and easy assembling/disassembling interface seat, which can be secured on the base casing of a computer in a fast and simple way and free from the meticulous care to the screws.

These and other objects, advantages and features of the present invention will be more fully understood and appreciated by reference to the written specification and appended drawings.

BRIEF DESCRIPTION OF THE DRAWINGS

FIG. 1 is a perspective view of an interface seat, an I/O port retaining plate, and part of a computer base casing, in accordance with the present invention;

FIG. 2 is a front view of the interface seat in accordance with the present invention;

FIG. 3 is a top view partially in section illustrating the assembly in accordance with the present invention; and FIG. 4 is a side elevational partially in section illustrating the assembly in accordance with the present invention.

DETAILED DESCRIPTION OF THE INVENTION

With reference to FIG. 1, an interface seat 1, in accordance with the present invention, is capable of being engaged with a base casing 2, an I/O port retaining plate 3 and a disk drive bracket 4 of a PC system unit.

FIGS. 2 through 4 show the interface seat 1 which is substantially a rectangular basin-like structure comprising an upper flange 10, a lower flange 14, and side flanges 17. There is an upper stop strip 11 and a first side stop strip 12 extended outward from the upper flange 10 and one of the side flanges 17, respectively, wherein the first side stop strip 12 has a perpendicular flange 18 formed thereon. A narrower second side stop strip 13 having an extending end extends outward from the other side flange 17. Outward-inclined tabs 121 and 131 are formed on the first side stop strip 12 and the second side stop strip 13, respectively. A pair of lugs 171 are respectively formed on the side flanges 17 and extend toward each other. A plurality of recesses 141 are formed on the lower flange 14. A pair of gaps 142 are formed between the lower flange 14 and the side flanges 17. At least two holes 15 are offsetted on the upper flange 10 to secure and support the disk drive bracket 4, which is to be described in detail hereinafter. A plurality of required expansion slots 16 are located in the body between the upper flange 10 and lower flange 14.

Referring particularly to FIG. 1, a back plate 20 of the base casing 2 is used for receiving the interface seat 1. The right part of the back plate 20 is the power supply plate 21 for installing a power supply unit (not shown). A strip 26 is formed on the inside surface of the power supply plate 21 and a constraint rib 261 is formed on one side of the strip 26. The left part of the back plate 20 is a side stop plate 28 with a perpendicular side extension 29 formed thereon, and a constraint rib 291 is formed on the side extension 29. The major area of the back plate 20 is occupied by a large cut-out recess 22 with stepped bottom flange 23 between the power supply plate 21 and the side stop plate 28. On each of the opposite sides of the cut-out recess 22, a guiding plate 27 with a notch 271 formed on the top thereof is formed for guiding and maintaining the interface seat 1 inbetween. A passage 25 is defined by the enclosure of the guiding plate 27, power supply plate 21, strip 26 and constraint rib 261 to allow the extension portion 13 to be inserted and thus secured therein. To match the outward-inclined tabs 121 and 131 of the interface seat 1, both the power supply plate 21 and side stop plate 28 are punched with a square opening 24, respectively.

With reference to FIGS. 1 and 4, the I/O port retaining plate 3 is substantially an elongated U-shaped member made by sheet metal. The I/O port retaining plate 3 is in connection with a mother board (not shown), wherein a plurality of outward-inclined tabs 31 corresponding to the recesses 141 of the interface seat 1 are formed on the top edge, and a plurality of outward-inclined tabs 32 formed on the bottom edge thereof. It should be noted that the base casing 2 is provided with a plurality of recesses 201 corresponding to the outward-inclined tabs 32 for engaging the I/O port retaining plate 3.

As shown in FIG. 4, a pair of cruciform posts 40, each of which depends from the disk drive bracket 4 and has a conical end portion, penetrate into holes 15 of the interface seat 1 and thus partially securing and supporting the disk drive bracket 4 by the interface seat 1.

Referring now to FIGS. 3 and 4, in installation, the I/O port retaining plate 3 is adapted to the base casing 2 by engaging the outward-inclined tabs 32 of the former with the corresponding recesses 201 of the latter. The interface seat 1 is disposed in the cut-out recess 22 with gaps 142 penetrated by the guiding plates 27 and then the outward-inclined tabs 31 on the top edge of the I/O port retaining plate 3 are engaged by the recesses 141 of the interface seat 1, wherein the lower flange 14 of the interface seat 1 fits into the stepped bottom flange 23 of the cut-out recess 22, the lugs 171 of the interface seat 1 are engaged with the notches 271 of the guiding plates 27, the first side stop strip 12 comes into contact with the inner side of the side stop plate 28 and the lower edge thereof abuts against the side extension 29 and the constraint rib 291, the second side stop strip 13 comes into contact with the inner side of the power supply plate 21 and the extending end of the second side stop strip 13 penetrates into the passage 25 to be clamped by the strip 26 and the constraint rib 261, and the outward-inclined tabs 121 and 131 of the interface seat 1 are engaged with the square openings 24 of the back plate 20 to provide a better securing effect. Consequently, the posts 40 of the disk drive bracket 4 are inserted into the holes 15 of the interface seat 1 with the rear edge of the disk drive bracket 4 abutting against the upper stop strip 11 of the interface seat 1.

Of course it is understood that the above is merely a preferred embodiment of the invention and that various changes and alterations can be made without departing from the spirit and broader aspects thereof as set forth in the appended claims.

What is claimed is:

1. An interface seat for a computer casing, the interface seat comprising:

a base plate having an upper flange, a lower flange and first and second opposite-side flanges, each of the flanges extending perpendicularly from the base plate in a same direction, the upper flange having an upper stop strip extending outwardly of the base plate and perpendicularly to the upper flange, the first side flange having a first side stop strip extending from one side outwardly of the base plate and perpendicularly to the first side flange and a perpendicular flange extending perpendicularly from an opposite side of the first side stop strip back toward the base plate, the second side flange having a second side stop strip extending from one side outwardly of the base plate and perpendicularly to the second side flange and having an end portion extending parallel to the base plate and past the lower flange, the first and second side stop strips having respective tabs nearer the upper flange than the lower flange and inclined from the respective one of the first and second side stop strips away from the base plate, there being respective gaps between the lower flange and the first and second side flanges, and the one sides of the first and second stop strips having respective lugs extending parallel to the base plate and towards each other.

* * * * *